United States Patent [19]

Malcolm et al.

[11] Patent Number: 4,619,670
[45] Date of Patent: Oct. 28, 1986

[54] APPARATUS FOR DIELECTROPHORETICALLY ENHANCED PARTICLE COLLECTION

[76] Inventors: David H. Malcolm, 18 Deer Run Dr., Randolph, N.J. 07869; George P. T. Wilenius, R. R. #1, Dunrobin, Ontario, Canada

[21] Appl. No.: 776,760

[22] Filed: Sep. 16, 1985

Related U.S. Application Data

[63] Continuation-in-part of Ser. No. 605,399, Apr. 30, 1984, Pat. No. 4,541,844.

[51] Int. Cl.$^4$ ............................................... B03C 3/16
[52] U.S. Cl. ........................................ 55/107; 55/122; 422/168; 422/177; 422/187
[58] Field of Search ................... 55/107, 122; 422/168, 422/177, 187

[56] References Cited

U.S. PATENT DOCUMENTS

| | | | |
|---|---|---|---|
| Re. 30,479 | 1/1981 | Cohen et al. ................ | 55/107 X |
| 3,016,979 | 1/1962 | Schmid ........................... | 55/107 X |
| 3,729,898 | 5/1973 | Richardson .................... | 55/107 X |
| 3,960,505 | 6/1976 | Marks ............................. | 55/122 X |
| 4,072,477 | 2/1978 | Hanson et al. ................ | 55/107 X |
| 4,095,962 | 6/1978 | Richards ........................ | 55/107 X |
| 4,141,698 | 2/1979 | Kihlstedt et al. ............. | 55/107 X |

Primary Examiner—Kathleen J. Prunner

[57] ABSTRACT

Method and apparatus for the removal of particulate matter, fumes, mists and noxious gases from a gas stream utilizing selectively sized and electrically charged water droplets, preferably between 10 and 60 microns, that exhibit significantly enhanced affinity for smaller uncharged particles through dielectrophoretic attraction, said droplets being present in such relatively low concentration that performance is not limited by space charge. The charged droplets are caused to move relative to the gas stream by inertial and/or electrostatic means, at such a velocity and path as to maximize encounters between charged droplets and the particles to be collected.

5 Claims, 9 Drawing Figures

APPARATUS FOR DIELECTROPHORETICALLY ENHANCED PARTICLE COLLECTION

This application is a continuation in-part of copending application Ser. No. 06/605,399, filed Apr. 30, 1984, now U.S. Pat. No. 4,541,844.

This invention relates to a method and apparatus for the removal of small sized particles, fumes, mists and vapors from a gas stream by using selectively sized electrically charged droplets.

Many systems and devices employing electrostatic forces have been proposed to remove particles from gas streams. Some of such systems have included the combined usage of electrostatic forces and water droplets but, for reasons pointed out herein, none have apparently resulted in successful commercial operation.

The most common present day particle collection systems employing water droplets as a collection medium are low energy scrubbers, such as spray towers, and high energy scrubbers such as venturi scrubbers. Both operate by producing a spray of water droplets which move relative to the particle bearing gas stream and the particles therein are collected on the droplets by collision processes. In a common form of spray tower, water droplets in the size range of 500 to 1000 microns fall, under the influence of gravity, down within a vertical tower through which passes a counter current flow of particle laden gases. The water droplets collect the particles and are removed at the bottom of the tower. In contradistinction, the venturi scrubber operates by accelerating the particle laden gas stream to between 50 and 100 meters per second, and sometimes higher, in a narrow duct or venturi using high pressure blowers. Water droplets, typically in the size range of 50 to 200 microns, are injected, usually transversely, at the throat of the venturi or near the upstream end of the duct and, until they are accelerated up to the stream velocity, the relatively high differential velocity between the water droplets and the particles in the gas stream results in a high collision rate and relatively efficient collection. The water droplets are subsequently collected in a cyclone or other collecting device. In general, spray towers are relatively inefficient whereas venturi scrubbers can be highly efficient. However, the efficiency of a venturi scrubber is generally proportional to the pressure drop in the system and such results in high energy costs for practical operation as compared to the low energy requirements of spray towers.

Numerous suggestions have been made which combine the use of electrostatic forces of water or liquid droplets for enhanced particle collection. British Pat. No. 5051 of Feb. 26, 1914 discloses a wet scrubber with counter current flows of negatively charged sprayed droplets and particle bearing gas stream in a vertical tube. The walls of the tube are charged positively. U.S. Pat. No. 1,958,406 discloses use of a ring shaped conductor to produce a fine spray of charged water droplets from a spray discharge nozzle. Similarly the U.S. Pat. Nos. 2,357,354 and 2,357,355 and the Marks U.S. Pat. No. 3,503,704 use a similar conductor to induce charge on the droplets, with all three systems relying upon the space charge field from the charged droplets to effect a collection of particles at the wall. A common characteristic of all the mechanisms and methods disclosed in the foregoing patents is the reliance upon the introduction of droplets at high velocity, whereupon their motion is controlled by the closely spaced induction charging electrodes resulting in low average relative velocity differences between the water droplets and the entrained particles and a lack of awareness of any need to limit space charge fields to levels where they do not impact the operation of the system, or of any need to limit the droplet size to the regime where dielectrophoretic forces have significant effect. U.S. Pat. No. 3,958,959 discloses the use of a set of discharge nozzles at high voltage for spraying water droplets created and charged by electrohydrodynamic action, and collection at plates disposed parallel to said discharge nozzles. In such system, however, the patent teaches the use of relatively large water droplets in the size range of 80 to 120 microns diameter charged close to the theoretical limits in order to attain high relative velocity between the water droplets and the gas stream containing the entrained particles. However, this patent shows no apparent awareness of, nor gives any consideration to, the practical limits of charging such particles nor to the resultant space charge fields, which operate to inhibit operation in all but the smallest sized systems. Other patents, typified by U.S. Pat. No. 2,525,347, disclose charging the entrained particles by an ionizing wire in the gas stream prior to interacting with accelerated charged water droplets produced by an induction ring electrode. However, the high velocities in the gas stream necessary to prevent liquid deposition on the ring electrode, operate to severely restrict the relative velocity differential between the entrained particulates and the water droplets and thus essentially rely upon the attraction of unlike charges thereon for efficient collection therebetween.

This invention may be described as an improved particle collection method and apparatus to produce and employ selectively sized and charged liquid droplets that exhibit enhanced attraction and capture cross-section for smaller sized and uncharged particulates, borne in a gas stream, through dielectrophoretic action. In a more particular aspect, the subject invention includes the production of water droplets of less than 60 microns in diameter bearing a charge of greater than $10^{-3}$ coulombs per kilogram having enhanced attraction, through dielectrophoretic action, for neutral particles less than 20 microns in diameter. In a still further aspect, the invention includes the production of water droplets of about 10 to 60 microns in diameter bearing a charge in the range of $10^{-3}$ to $2 \times 10^{-2}$ coulombs per kilogram that have enhanced attraction, through dielectrophoretic action for particles less than 20 microns in diameter, and which minimizes the undesireable performance impairing space charge effects that have generally characterized prior proposed charged liquid droplet particle collection systems.

The primary object of this invention is the provision of improved particle collection methods and apparatus for producing and employing selectively sized and charged liquid droplets that exhibit enhanced attraction and capture cross section for smaller sized uncharged particulates borne in a gas stream, by dielectrophoretic action.

Another object of the invention is the provision of improved method and apparatus to produce and employ water droplets of less than 60 microns in diameter bearing a charge of greater than $10^{-3}$ coulombs per kilogram having enhanced attration, through dielectrophoretic action, for neutral particles of less than 20 microns in diameter, for particle collection.

Another object of this invention is to provide a means of efficiently removing particulates of between 0.02 and 20 microns in diameter by dielectrophoretically enhanced collision with selectively sized charged water droplets through utilization of a ratio of water volume to volume of gas treated of less than 1 in 3000.

Apparatus incorporating the principles of this invention in the form of low energy embodiments may be generally characterized as selectively constructed spray towers.

In such low energy embodiment of this invention, the gas containing the entrained particles, fumes or mist is passed vertically through an annulus formed by two concentric conducting members, the outer of which is maintained at ground potential and the inner one of which is maintained at high electrical potential, typically between 20 and 200 kilovolts and sometimes higher. In one preferred embodiment water is sprayed radially inwards from the outer grounded member by suitable atomizing jets, nozzles or the like. Such droplets are charged, simultaneously with the formation thereof, by induction charging under the influence of the electric field between the central conducting member and the grounded outer member. The nozzles, which are preferably flat fan nozzles with the plane of atomization disposed normal to the direction of gas flow, are uniformally disposed circumferentially and vertically around the inner wall of the outer member. The charged water droplets move transversely across the gas flow in a radially inward direction, toward and to the central conductor, under the influence of the electric field between the two members. In another preferred embodiment, water is sprayed radially outward toward the outer grounded member by suitable atomizing jets, nozzles or the like. Such droplets are charged, simultaneously with the formation thereof, by contact charging under the influence of the electric field between the high potential central conducting member and the grounded outer member. The nozzles, which can again be in the form of flat fan nozzles with the plane of atomization disposed normal to the direction of gas flow, are desirably uniformally disposed circumferentially and vertically around outer wall of the the inner member. The charged water droplets move transversely across the gas flow in a radially outward direction, outwardly from the central conductor, enhanced by the influence of the electric field between the two members.

In either embodiment, the spray nozzles are adjusted to produce liquid droplets between 10 and 60 microns in diameter and preferably in a size range between 15 and 40 microns in diameter in the operating environment. Volume flow rate of water through the nozzles will be controlled to preferably be in the range of $10^{-5}$ to $3\times10^{-4}$ of the volume rate of the gas to be cleaned. The electrical potential of the charging electrode, which may be of either polarity, is maintained at an appropriate level to charge the water droplets to a charge level of between $10^{-3}$ and $2\times10^{-2}$ coulombs per kilogram. As will be later pointed out in greater detail, liquid droplets of this size and charge level exhibit an enhanced affinity for the attraction of uncharged droplets of smaller size and operate to efficiently collect such smaller particles. The magnitude of the electric field between the inner and outer defining walls of the annulus is desirably maintained between $10^5$ and $2\times10^6$ volts per meter. Under the influence of an electric field of $5\times10^5$ volts per meter, a 40 micron diameter water droplet, charged at a level of $4\times10^{-3}$ coulombs per kilogram, will traverse the annulus at a velocity of about 20 meters per second. As generally pointed out above, the enhanced affinity for smaller uncharged particles exhibited by water droplets of this size and charge level and moving at relative speeds of this magnitude results in highly efficient particle collision and collection.

In the first of the herein disclosed embodiments, the water droplets containing the captured particles flow downward on the cylindrical surface of the charged inner conductor member under the influence of gravitational forces and, if suitably uniformly distributed around the inner cylindrical wall, can be caused to break up under the influence of the electrical field between the inner conductor at high electrical potential and a grounded conducting reservoir disposed in spaced relation around and beneath the lower end of said inner conductor, thus providing effective electrical isolation between the two, all as more fully described hereinafter.

In the second of the herein disclosed embodiments, the water droplets will emmanate from the charged inner conductive member and will flow downwardly on the inner surface of the grounded outer conductive member.

In any of the hereinafter described embodiments of this invention, the water droplets may contain a suitable chemical agent to react with the undesirable vaporous components of the gas stream, such reaction being enhanced by the large surface to volume ratio associated with small particles and by the enhanced diffusion which takes place in the boundary layer of charged droplets.

Other objects and advantages of the subject invention will be pointed out in the following portions of this specification and claims and will be apparent from the appended drawings which disclose, in accord with the mandate of the patent statutes, two presently preferred embodiments that incorporate the principles of the invention.

Referring to the drawings:

FIG. 1 is a schematic side elevational view of the one type of low energy charged droplet scrubber incorporating the principles of this invention.

FIG. 2 is a section as taken on the line 2—2 of FIG. 1.

FIG. 3 is a schematic side elevational view of suitable means for providing discharge of effluent water to a grounded reservoir for use in apparatus of the general type shown in FIG. 1.

FIG. 4 is a schematic side elevational view of a second and alternative embodiment of a low energy charged droplet scrubber incorporating the principle of this invention.

FIG. 5 illustrates, in section, a portion of small diameter central conductive member having nozzle-like apertures therein to produce horizontal flat fan shaped water spray patterns.

FIG. 6 schematically illustrates a low energy scrubber construction employing a plurality of packed parallel operating units for cleaning very large volumes of gas.

FIG. 7 is a logarithmic plot of droplet velocity relative to the gas stream under various electric fields for water droplets charged to 20% of the Rayleigh limit.

FIG. 8 is an enlarged schematic depiction of charge distribution which effects dielectrophoretic attraction between a charged droplet and an uncharged smaller particle.

Figure 1:
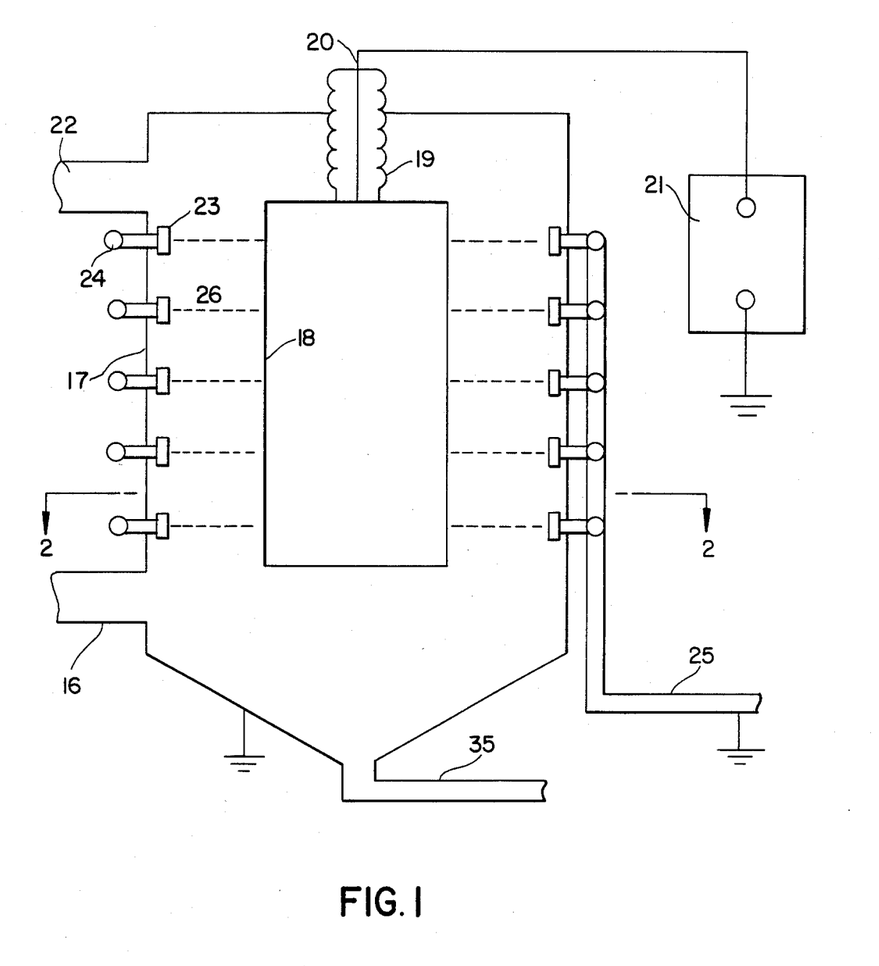
Figure 2:
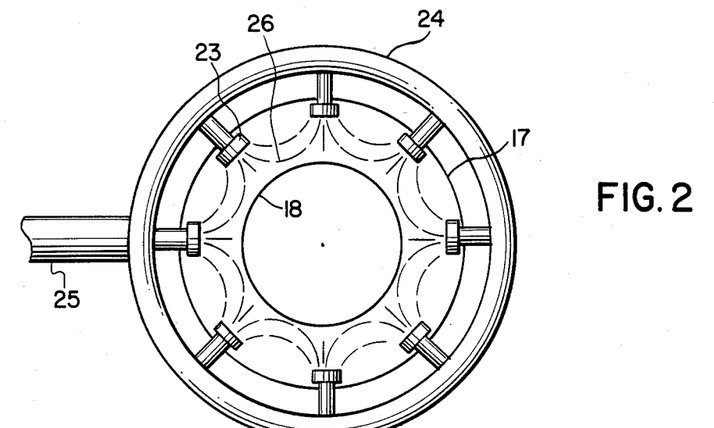
Figure 3:
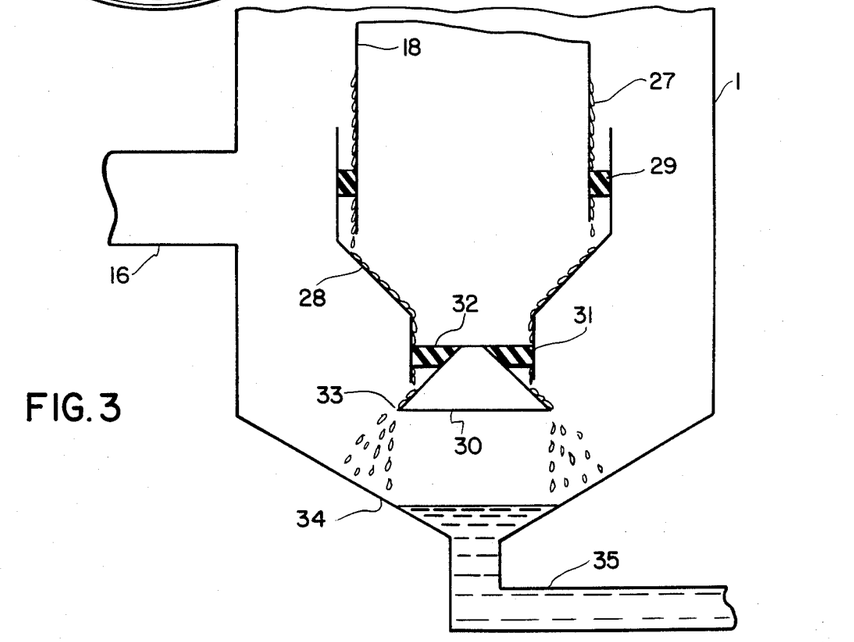

Referring now to FIGS. 1, 2 and 3 there is illustrated exemplary elements incorporated on one type of a low energy scrubber embodiment incorporating the principles of this invention. As there shown, the gas stream enters the scrubber through a port or ports 16 at the base of an outer grounded cylindrical conducting tower 17, and passes upward through the annulus formed between the grounded outer conducting cylinder 17 and an inner and electrically isolated concentric conducting cylinder 18 suitably suspended from the roof of the the outer cylinder 17 by one or more convoluted insulating members 19. The inner conducting cylinder 18 is maintained at high DC potential, typically between 20 and 100 kilovolts, but sometimes higher, by connection through conductor 20 to one pole of an external DC high voltage power supply 21. The cleaned gas stream exits at the top of the tower through port 22. Disposed in circumferential and vertical spaced relation on the inner wall of the outer conducting cylinder 17 are a plurality of spray nozzles 23 fed through multiple manifolds 24 from a remote pressurized source of water (not shown) via a connecting pipe 25. FIGS. 1 and 2 depict an array of forth discreet spray nozzles for clarity, but such number may vary with the exigencies of the environment. Such nozzles 23 are again preferably flat fan pattern nozzles with the plane of atomization disposed normal to the direction of flow of the gas stream in the annulus, but hollow cone nozzles or other atomizing means capable of producing discreet droplets of desired size as heretofore described may also be utilized. The spray of selectively sized water droplets 26 is charged inductively by the electric field extant between the grounded nozzles 23 and the high potential inner conducting cylinder 18. The induced charge on the spray particles is opposite in polarity to that of the charge on the inner cylinder 18 so that the sprayed water droplets are caused to traverse the annulus in essentially a horizontal radially inward direction toward and to the central electrode 18 at high velocity. The magnitude of such transverse spray velocity will be proportional to the magnitude of the electric field between the two concentric cylinders, the magnitude of electric charge carried by the water droplets and the initial velocity of such droplets at the locus of spray emission. The center cylinder can be either positively or negatively charged, however, if the entrained particles are known to be predominantly of one polarity then a charge of opposite polarity should be induced on the water droplets to further enhance the collection processes.

The presently preferred mechanism for effecting removal of the collected water droplets is shown on an enlarged scale and in greater detail in FIG. 3.

The vertical velocity of the gas stream within the annulus is typically low, desirably between 1 and 5 meters per second, so as to minimize pressure drop since, in this low energy embodiment, high relative velocity between the charged water droplets and the entrained particles to be collected results primarily from the high velocity of water droplets traversing the annulus under the influence of the electric field.

As shown in FIG. 3, a liquid film 27 constituted by the collected water droplets together with the collected entrained particles, flows vertically downward on the outer surface of the electrically charged inner cylinder 18 under the influence of gravity. The water film 27 flows into a small annulus formed between the cylinder 18 and the upper end of a funnel 28 mounted on the lower extremity of the electrode cylinder 18 by a web of three or more connecting members 29. Such web is of open construction to provide only small impedance to the downward flow of water. The water film 27 flows uniformly down the inner walls of the funnel 28 which may be suitably grooved or channeled to uniformly distribute the liquid as it flows onto the outer surface of an inverted conducting cone 30 mounted concentrically within the discharge conduit 31 of the funnel by a second web of three or more connecting members 32. The dependent end of the inverted cone 30 is sized to extend significantly beyond the perimeter of the funnel discharge conduit section 31 and, being of relatively small diameter and of the same high electrical potential as the central electrode cylinder 18 produces a strong electric field at its lower perimetric extremity 33. The water film flowing on the outer surface of the inverted cone 30 is broken up into discrete droplets by electrohydrodynamic action resulting from the strong electric fields extant at the lower cone extremity, such discrete droplets are attracted to the lower inner wall of the outer grounded conductor 17 to there accumulate in the funnel section 34 formed at the dependent end of the outer cylinder prior to being discharged through conduit 35 at ground potential.

As will now be apparent from the foregoing, all water conduits and supplies are maintained at ground potential and in addition all electrodes or other high voltage elements are totally and safely enclosed in grounded enclosures.

Figure 4:
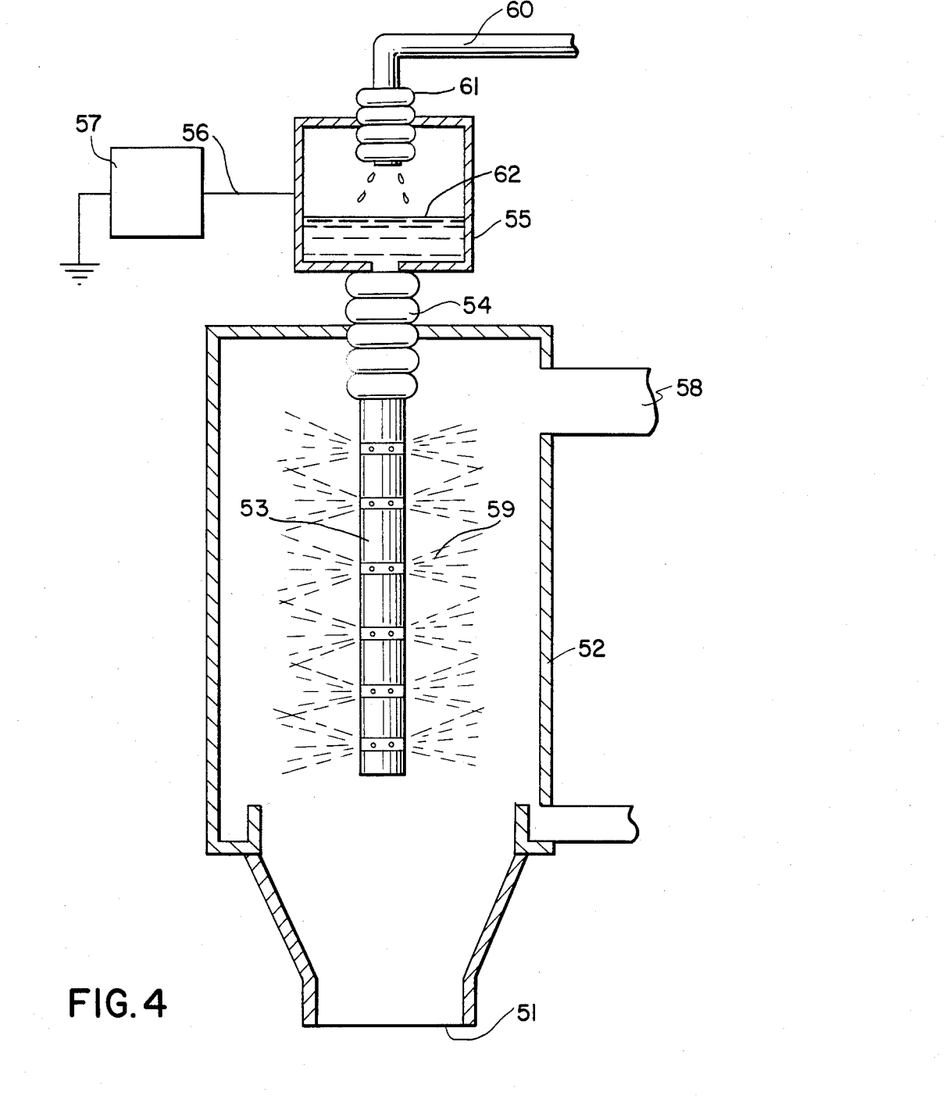

FIG. 4 illustrates exemplary elements incorporated into a second and alternative type of low energy scrubber incorporating the principles of this invention. As there shown, the gas stream enters the scrubber through a port or ports 51 at the base of an outer grounded cylindrical conducting tower 52, and passes upwards through the annulus formed between the outer conducting cylinder 52 and an inner and electrically isolated charged concentric conducting cylinder 53, again suitably mounted and suspended by one or more convoluted insulated members 54 which pass through the roof of the outer conducting cylinder 52. The inner conducting cylinder 53 is connected to a pressurized conducting reservoir 55 which is maintained at high DC potential, typically between 50 and 150 kilovolts but sometimes higher, by connection through conductor 56 to one pole of a high voltage power supply 57. The cleaned gas stream exits at the top of the tower 52 through port 58.

Disposed in circumferential and vertical spaced relation on or in the outer wall of the inner conductive cylinder 53 are a plurality of spray nozzles 59 fed from the pressurized reservoir 55. The reservoir 55 is supplied with water from an inlet pipe 60 maintained at ground potential and suitably isolated from the conducting reservoir 55 by convoluted insulating means 61. The rate of flow of liquid into reservoir 55 is suitably controlled by a differential regulator of conventional construction. The water flow from inlet pipe 60 is broken up by suitable electromechanical or mechanical means prior to impacting the liquid surface 62 in accord with known voltage blocking techniques to prevent electrical current leakage between the grounded water source 60 and the liquid surface 62 at high DC potential. The nozzles 59 in the inner cylinder 53 are again preferably of the flat fan pattern type, with the plane of atomization being disposed normal to the direction of flow of the gas stream in the annulus but, as was the case for the first described embodiment, other types of nozzles may be used. The inner conducting cylinder 53 is relatively small in diameter and preferably less than one tenth the diameter of the outer conducting cylinder 52, since information available to date apparently indicates that higher collection efficiencies at lower power supply voltages result from this configuration.

Figure 5:
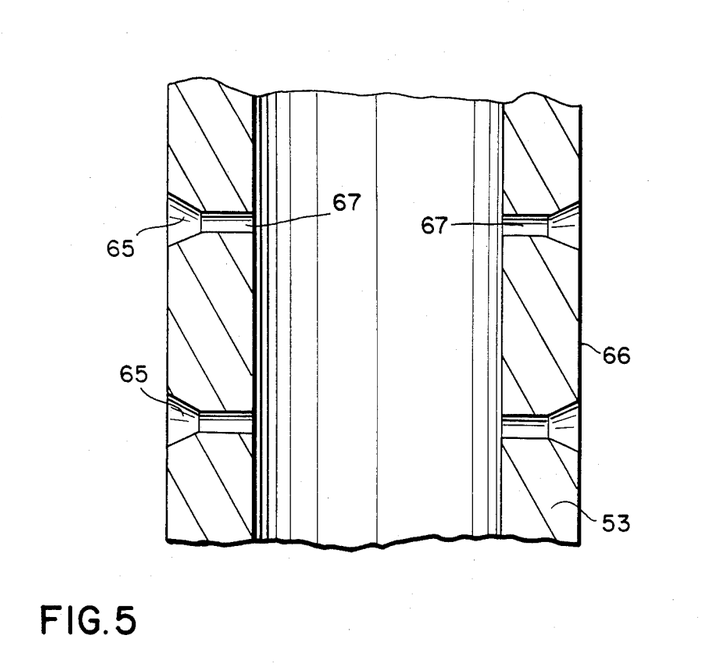

FIG. 5 is a vertical diametric cross-section of a portion of the inner conductive cylinder 53 that schematically illustrates easily formed flat fan pattern nozzles in the wall thereof. As shown, a series of circumferential V-shaped grooves 65 are machined in the outer surface 66 of inner conducting member 53. A plurality of circular holes 67 may then be introduced at spaced intervals around the circumference of the conducting member 53 in such manner as to fluidly connect the base of the V-shaped grooves 65 to the interior of the conductive member 53. In practice, the diameter of the holes 67 is not greater than about half the height of the V groove 65 and typically will be less than 0.5 millimeter in diameter in order to provide spray droplets of the desired size.

Figure 6:
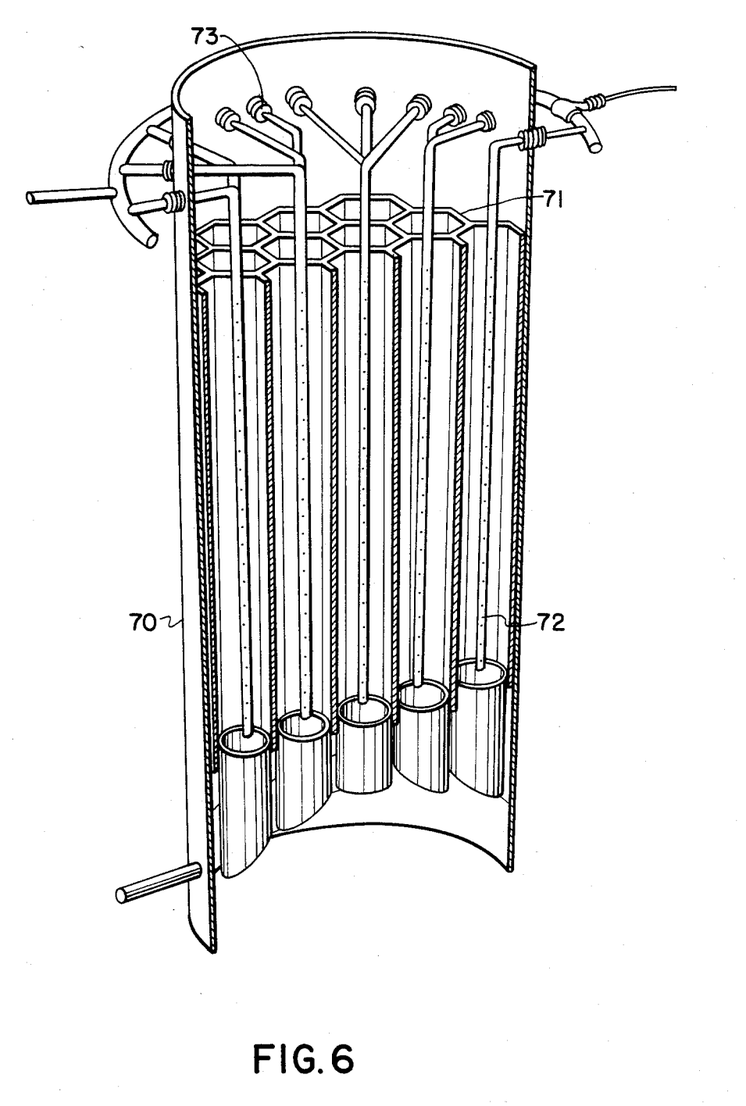

FIG. 6 schematically illustrates how the principles of this invention can be applied to the handling of large volume flow rates of particle laden gases.

Available information has indicated that large diameter cylinders 52 require undesirably large DC potentials for operation and such results in decreased efficiency of collection because of the high space charge fields that are created in such environment. As there shown a plurality of packed hexagon shaped ducts 71 of small cross-sectional area are disposed within a larger diameter outer shell 70. Hexagon shaped ducts are preferred since, as compared to circles or squares, they result in high utilization of cross-sectional area and behave in a generally similar manner to a cylinder with regard to the shape of the electrical fields therein, though ducts of cylindrical or square cross-section may also be utilized. The relatively small diameter inner central conducting cylinders 72 in the FIG. 6 construction are connected via insulated bushings 73 to a water supply manifold which is connected to a voltage block isolated and pressurized reservoir as previously described. It will now be apparent to those skilled in the art that utilizing a multi cell construction of the described character will permit operation of a low energy scrubber of the type and manner described herein in very large volume gas cleaning operations without degradation of performance.

As pointed out earlier in this specification, the methods and apparatus herein disclosed employ dielectrophoretic forces to enhance collection efficiencies. The operating parameters within which such dielectrophoretic phenomena can be effectively employed in the low energy environments as described herein are each attended with some degree of criticality, largely due to the essentially antithetical effects of certain phenomena which inherently attend the use of electrostatic forces in a particulate environment.

By way of background, it has long been recognized that there is a theoretical limit to the amount of charge that a liquid droplet may carry. Lord Rayleigh long ago demonstrated that a highly charged liquid droplet will disintegrate when the outward pressure produced by the repulsion of like charges exceeds the surface tension forces holding the droplet together and such charge limit, which is a function of diameter, is generally known as the Rayleigh limit. While the Rayleigh limit has been approached in experimentation in a low concentration droplet environment, available evidence indicates that such Rayleigh limit charging cannot even be closely approached in a droplet environment concentration that would permit practicable scrubber operation. Available evidence does appear to indicate, however, that it is feasible to charge water droplets in the 10 to 100 micron diameter range to about 35% of the Rayleigh limit and probably not significantly higher when such droplets are produced in sufficient quantities to make practicable the operation of a commercial charged droplet scrubber.

Figure 7:
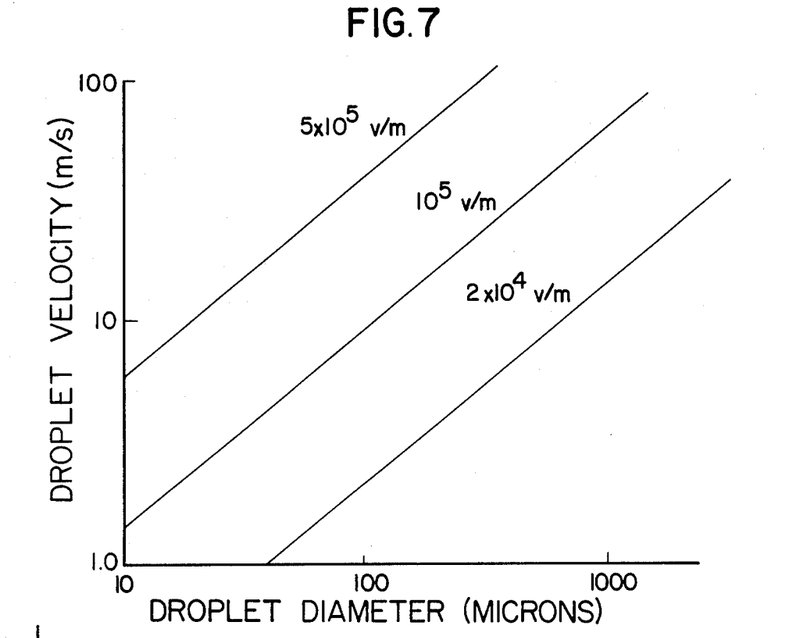

In consideration of such practical limitation, FIG. 7 shows the velocity which can practicably be attained by charged water droplets in various strength electric fields. For example, a 40 micron diameter droplet in a field of $3 \times 10^5$ volts per meter will traverse the gas flow at about 15 meters per second.

It has been established in an article by Stairmand titled "Dust Collection by Impingement and Diffusion" (Trans. I. Chem. E. 1950), that the collection efficiency per impact of an uncharged liquid droplet is related to the dimensionless number $Dg/Vf$, where D is the droplet diameter, g is gravitational acceleration, V is the velocity of approach of the droplet and particle and f is the free falling speed of the particle to be collected. The collection efficiency increases in a nonlinear, inverse manner to this dimensionless number and consequently, it has been an inherent aim of most, if not all, prior art scrubber devices to achieve a ratio of D/V that is as small as possible. Unfortunately, in conventional prior practices and apparatus, these aims are generally mutually contradictory and permitted operation is the result of selective sacrifice of one of these parameters at the expense of the other or of a compromise between the two. For example, in a low energy spray tower collector, the attainment of a high value of V, in this case the terminal velocity of the water droplets, requires a large diameter D for the droplet. Similarly in a high energy venturi scrubber, where droplets are injected into a high velocity moving gas stream at the throat of the venturi, small diameter droplets accelerate much more quickly to the gas stream velocity than larger droplets resulting in a lower mean approach velocity for such smaller droplets and entrained particles. Similarly in prior art devices such as that disclosed by U.S. Pat. No. 3,958,959, it is seen from FIG. 7 that D and V increase together and, in fact, when compared to similar values attainable in conventional venturi scrubbers, would appear to yield inferior performance.

In the practice of this invention therefor, the use of considerably smaller droplets than heretofore considered, i.e. less than 60 microns, and preferably in the range of 15 to 40 microns in diameter, considerably improves performance that may be attained compared to prior art devices by the permitted utilization of the forces of dielectrophoretic attraction.

Figure 8:
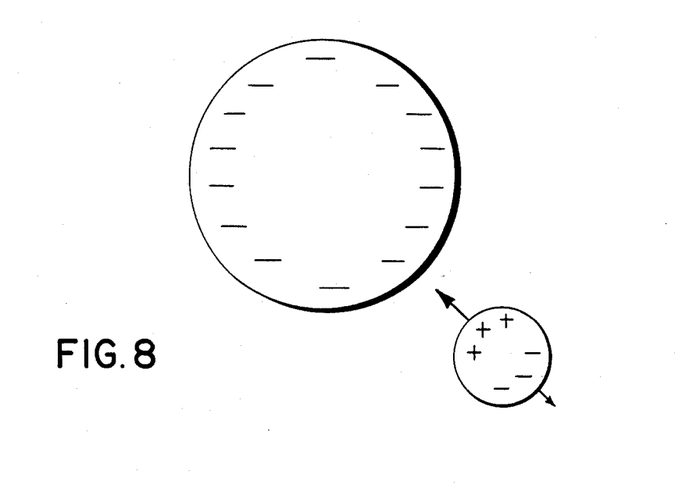
Figure 9:
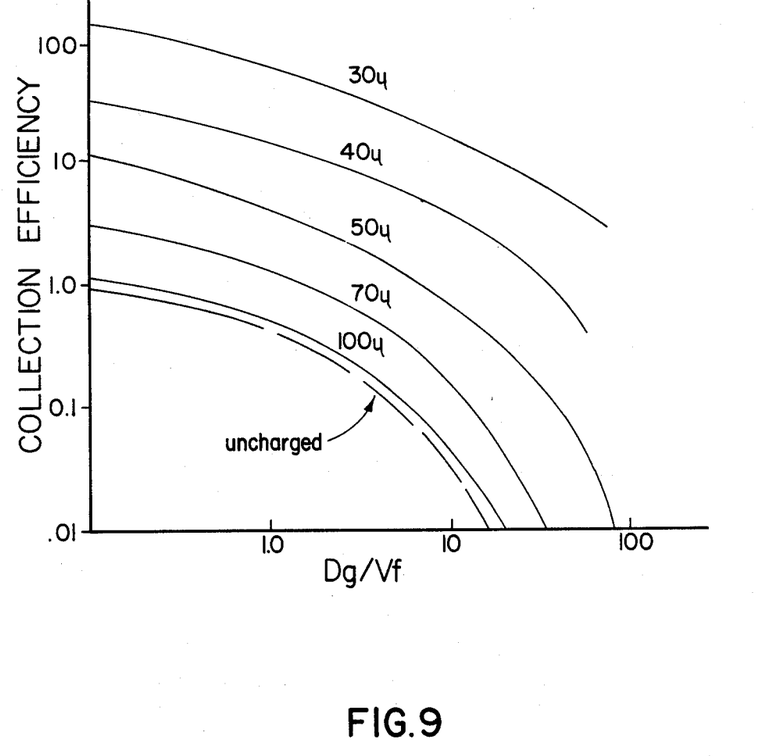
FIG. 9 is a logarithmic plot of collection efficiency per impact for uncharged particles and for charged particles of various diameters carrying $8 \times 10^5$ electron charges, versus the dimensionless number Dg/Vf.

The nature of such dielectrophoretic attraction is schematically depicted in FIG. 8 where the larger sphere represents a negatively charged water droplet in proximity to a smaller uncharged particle, which may be either solid or liquid and which has some small degree of electrical conductivity. The electric field around the larger droplet effects a selective attraction and separation of positive charge within the smaller particle and concommitment repulsion of negative charge, causing polarization of the smaller particle, as shown. Since the forces between charges are inversely proportional to the square of the distance between them, the attractive force between the negative charge on the water droplet and the closely spaced positive charge on the smaller droplet will be substantially higher than the repulsion force between the negative charge on the water droplets and the more widely spaced and remote negative charge on the smaller particle. A net attractive force will therefor exist between the water droplet and the smaller particle. Though little investigative attention has been devoted to this phenomenon, Pauthenier et al (C.R. Acad. Scf., Paris 231 213, 1950) and Cochet (C.R. Acad. Sci., Paris 233 190, 1951) showed that for a droplet carrying a charge of $1.3 \times 10^{-13}$ coulombs (which would be 20% of the Rayleigh limit for a 38 micron diameter droplet), that the collection efficiency increases for charged droplets below 100 microns diameter and increases substantially for charged droplets below 60 microns in diameter, especially when the collected particles are below 10 microns in diameter. This phenomenon was confirmed and later used by the applicant herein as a factor in a fog precipitation program by the Naval Weapons Center in China Lake, Calif. as reported by Carroz and Keller (NWC TP 5796, 1976).

FIG. 9 schematically shows the collection efficiency per impact of uncharged water droplets as derived by Stairmand and of charged water droplets derived from the data of Cochet, as a function of the dimensionless number Dg/Vf. It should be noted that in the case of charged droplets the collection efficiency increases with decrease in water droplet size for any given value of Dg/Vf. In the case of charged particles, efficiencies considerably greater than 1.0, which represents 100%, may arise, since paths which do not intersect geometrically will still result in collection due to the electrostatic forces. For uncharged droplets the illustrated efficiency of 1.0 or 100% represents the ideal case where the paths of the droplet and the collected particle intersect geometrically. Although collection efficiency continually increases as droplet size becomes smaller, the problems of atomization and space charge density and downstream collection of the droplets in the case of the high energy scrubber, operate to practicably preclude the use of very small water droplets. In the practice of the collection methods described herein, charged water droplets in the range about 10 microns at the lower end up to 60 microns are suitable and a size range between 15 and 40 microns is preferred.

It is likewise apparent from an examination of the characteristics of FIG. 9 that in a charged droplet scrubber of either of the low energy types described above and constructed in accordance with the principles disclosed herein, it is not necessary to employ very high relative velocities between droplets and particles to be collected to achieve highly efficient operation and collection.

As will be understood by those skilled in the art, other factors beside individual droplet impact collection efficiency affect the collection of particles in scrubbers of all types, and among the most important of which is the area swept by the water droplets. The area swept, for a given volume flow of water, is proportional to the distance the droplet travels relative to the gas stream and is inversely proportional to the diameter of the water droplet or $$V/V_w = 3L/2D$$

where V is the volume of gas swept by the water droplets, Vw is the volume of water, L is the mean path length of the water droplets and D is the droplet diameter.

In the case of conventional venturi scrubbers, the attainment of large values of L is incompatible with the use of small values of the droplet diameter D, as heretofore discussed. Of equal disadvantage, proposed prior art charged droplet scrubbers, which necessarily use similar quantities of water to conventional scrubbers are subject to severe size limitations resulting from the high space charges attendant high concentrations of highly charged droplets, and which largely negate electrostatic benefit anf negatively impact the overall performance of the system.

In the practice of the herein disclosed method, in both of the described low energy embodiments, not only are large volumes of water not necessary but such use will impair overall efficiency of the system. For example, conventional venturi and conventional low energy scrubbers typically operate with a water flow rate up to and occasionally exceeding a cubic meter of water for each 1000 cubic meters of particulate bearing gas being treated. A charged droplet scrubber of the type disclosed herein and exemplarily constructed and operated with hereinafter set forth operating parameters will yield equal or even better collection performance than a conventional venturi or low energy scrubber, while employing a water consumption that is on the order of one tenth this level. By way of example, suitable small charged droplet low energy scrubbers constructed in accordance with the principles of this invention illustratively operate in accord with the following parameters:

| | |
|---|---|
| Gas flow rate (m3/hr) | 6000 |
| Water flow rate (m3/hr) | 0.6 |
| Water droplet size (microns) | 40 |
| Charge level (coulombs/kg) | $4\times10^{-3}$ |
| Outer duct diameter (m) | 0.75 |
| Inner duct diameter (m) | 0.38 |
| Gas flow velocity (m/s) | 5.0 |
| Pressure drop (mb) | 3.0 |
| Height (m) | 2.0 |
| Voltage (kv) | 60 |
| Current (microamps) | 670 |
| Electrical power (watts) | 40 |
| Droplet traverse velocity (m/s) | 15 |
| Charge density in duct (cb/m3) | $1.2\times10^{-5}$ |
| Efficiency (5 microns) (%) | 99.9 |
| Efficiency (2 micron) (%) | 99.0 |
| Efficiency (1 micron) (%) | 97.0 |
| Efficiency (0.1 micron) (%) | 12.0 |

As will now be apparent to those skilled in that art, the permitted usage of dielectrophoretically enhanced particle collection as disclosed and described herein, generally employs water droplets in a size range from 10 microns at the lower level up to about 60 microns, bearing a charge of less than about one third of the Rayleigh limit and in a volume generally less than about three ten thousandths of the volume of gas to be cleaned in an environment of permitted lower pressure drops and in apparatus where all high potential bearing elements are safely enclosed within a grounded structure and where all discharge conduits are likewise at ground potential.

Having thus described my invention, I claim:

1. Apparatus for effecting dielectrophoretically enhanced separation of small sized particulates from a moving gas stream comprising conduit means for confining said moving gas stream bearing said particulates, a high potential electrode element disposed coaxially within said conduit means, means for introducing a spray of selectively sized and charged liquid droplets of from 10 to 60 microns in diameter outwardly directed from said high potential electrode element into said gas stream in a path relative to the advance of said gas stream to maximize geometric interdiction of said charged droplets and the particulates in said gas stream, means associated with said spray introduction means for limiting the size of said introduced liquid droplets to 60 microns or less in diameter, means for applying an electrical charge of greater than $10^{-3}$ coulombs per kilogram to said emitted spray Oroplets, such charge not being greater than 35 percent of the Rayleigh limit therefore and, means for regulating the volume of liquid so introduced in droplet form to be in the order to about three ten thousandths that of the volume of gas being treated per unit time to minimize space charge degradation of the collecting environment with attendant maximization of dielectrophoretic attraction forces therewithin.

2. Apparatus as set forth in claim 1 wherein the diameter of said charged droplets is maintained between 15 and 40 microns.

3. Apparatus as set forth in claim 1 wherein the droplets introduced in said spray will have an electrical charge thereon intermediate $2\times10^{-2}$ and $1\times10^{-3}$ coulombs per kilogram.

4. Apparatus as set forth in claim 1 wherein said electrode element and said spray introduction means form a combined element and wherein said conduit means is in the form of an annulus defined by an outer grounded shell surrounding said combined element and through which the moving gas stream is directed, and said spray introduction means selectively directs said emitted droplets from said combined element to said outer grounded shell substantially transversely to the path of advance of said gas stream.

5. Apparatus as set forth in claim 1 wherein the droplets in said introduced spray of liquid droplets contain a chemical agent to react with at least one gaseous component in said moving gas stream.

* * * * *